June 28, 1960 G. L. BARNARD 2,943,260
GATING CIRCUIT WITH PEDESTAL CONTROL
Filed April 28, 1958
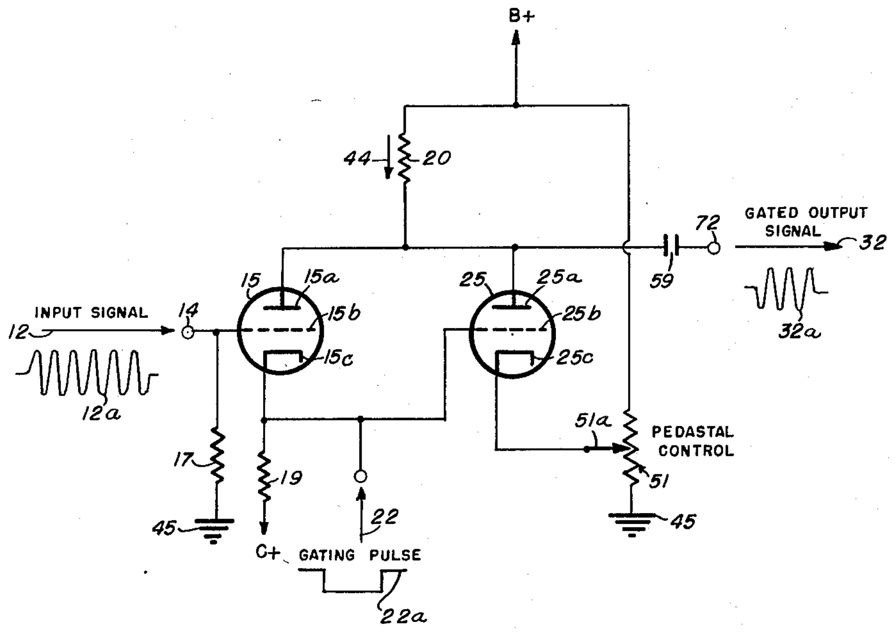
INVENTOR
GEORGE L. BARNARD
BY W. E. Thibodeau, J. E. McGee, J. P. Edgerton & N. Cass United States Patent Office 2,943,260

Patented June 28, 1960

2,943,260

GATING CIRCUIT WITH PEDESTAL CONTROL

George L. Barnard, Rockville, Md., assignor to the United States of America as represented by the Secretary of the Army Filed Apr. 28, 1958, Ser. No. 731,554

1 Claim. (Cl. 328—91)

(Granted under Title 35, U.S. Code (1952), sec. 266)

The invention described herein may be manufactured and used by or for the Government for governmental purposes without the payment of any royalty thereon.

This invention relates to gating circuits in general and more particularly to an improved gating circuit having means for modifying or entirely removing unwanted D.-C. gating components, conventionally known as pedestals.

Conventional gating circuits have the disadvantage of producing a voltage shift in the plate or cathode circuits when the vacuum tube current is altered by the gating pulse. This results in a D.-C. component or pedestal being introduced into the output signal. Such D.-C. components are undesirable for a variety of well known reasons. For example, these gating transients cause unwanted frequencies to appear in the output signal, produce undesired biases, and may cause undesirable shock excitation of resonant circuits.

The most common method of removing these pedestals in the output signal is to couple out the signal by means of a capacitor. Although this makes the average D.-C. level zero, the storage properties of the capacitor will introduce undesirable distortions into the output signal because of its effect on the gating envelope. For many applications, therefore, this capacitive coupling method will be unsatisfactory.

Accordingly, it is an object of this invention to provide an improved gating circuit whose signal output is completely free of pedestal effects.

It is an additional object to provide an improved gating circuit having a signal output with an accurately adjustable pedestal.

In a typical embodiment of the invention these objects are accomplished by means of an additional tube connected to the gating tube so as to nullify or modify D.-C. level changes produced by the gating pulse.

The specific nature of the invention, as well as other objects, uses, and advantages thereof, will clearly appear from the following description and from the accompanying drawing, in which:

The drawing is a circuit diagram of an improved gating circuit in accordance with the invention.

In the drawing is shown a gating tube 15 and a pedestal control tube 25 having a common plate resistor 20. One end of the plate resistor 20 is connected to a D.-C. voltage source B+ and the other end is connected to the plates 15*a* and 25*a* of the gating tube 15 and the pedestal control tube 25, respectively. The gating tube 15 is maintained below cut-off by a D.-C. bias C+ connected to the gating tube cathode 15*c* through a cathode resistor

19. A grid resistor 17 is connected between the gating tube grid 15*b* and circuit ground 45.

An input signal 12, illustrated by 12*a*, is applied to the gating tube grid 15*b* by means of a circuit input terminal 14. Since the bias source C+ keeps the gating tube 15 below cut-off, no signal appears at the plate 15*a*. To gate in on the input signal 12, the gating tube cathode 15*c* is driven by a gating pulse 22 (illustrated by 22*a*) to a voltage such that the tube 15 conducts and an amplified input signal appears at the gating tube plate 15*a*. As is well known, the gating pulse 22 causes a conduction plate current to flow through the plate resistor 20. This would ordinarily produce a pedestal or D.-C. level shift at the gating tube plate 15*a*. However, as now will be described, the pedestal control tube 25 is connected so as to modify or nullify the pedestal that would otherwise be obtained.

When the gating pulse 22 is applied to the gating tube cathode 15*c*, it is also simultaneously applied to the grid 25*b* of the pedestal control tube 25. The pedestal tube cathode 25*c* is connected to the variable arm 51*a* of a pedestal control potentiometer 51, the ends of the potentiometer 51 being connected between B+ and circuit ground 45. With no gating pulse 22 applied, the pedestal tube 25 is made to conduct at a predetermined value of plate current 44 by adjusting the variable arm 51*a* of the potentiometer 51. This predetermined value of plate current is chosen to be equal to the conduction plate current caused by application of the gating pulse 22 to the gating tube cathode 15*c*. The gating pulse 22 is adapted to cut-off the pedestal control tube 25. Therefore, when the gating pulse 22 is applied, the increase in plate current in the gating tube 15 will be counterbalanced by the decrease in plate current in the pedestal tube 25. The result is that no gating pedestal appears at the plates 15*a* and 25*a*, and thus the output signal 32 may be coupled out through a coupling capacitor 59 without distortion. The coupling capacitor 59 keeps the D.-C. voltage on the plate 15*a* and 25*a* from the output terminal 72, so that the output signal 32, as represented by 32*a*, has no D.-C. level and no gating pedestal.

It should be noted that the voltage on the pedestal control tube cathode 25*c* may alternatively be adjusted to modify, rather than nullify, the gating pedestal so that some desired value of pedestal is produced.

It will be apparent that the embodiments shown are only exemplary and that various modifications can be made in construction and arrangement within the scope of the invention as defined in the appended claim.

I claim as my invention:

A gating control circuit comprising a gating tube having a cathode, a grid and an anode, means for applying to the grid of said gating tube an input signal to be gated, biasing means for normally maintaining said gating tube nonconducting, said biasing means being connected to the cathode of said gating tube, a pedestal control tube having a cathode, a grid and an anode, means connecting the grid of said pedestal control tube to the cathode of said gating tube, circuit means connecting the anode of said pedestal control tube to the anode of said gating tube, a common load resistor connected to said circuit means, adjustable bias means for normally maintaining said pedestal control tube conducting with a predetermined current flowing through said load resistor, said adjustable bias means being connected to the cathode of said pedestal control tube, gating pulse means for causing said gating tube to conduct with a current equal to said predetermined current flowing through said load resistor and for simultaneously cutting off said pedestal control tube, said gating pulse means being connected to the cathode of said gating tube and to the grid of said pedestal control tube, an output terminal, and a coupling capacitor connected between said circuit means and said output terminal, the output signal at said output terminal containing no pedestal since the increase in the current flowing through said gating tube is counterbalanced by a decrease of an equal amount of current flowing through said pedestal control tube.

References Cited in the file of this patent

FOREIGN PATENTS 645,628 Great Britain ------------ Nov. 1, 1950

OTHER REFERENCES

Cathode-Follower Gate Circuit (Kurshan); The Review of Scientific Instruments, September 1947, vol. 18, Number 9 (pages 647–649 relied on).